(12) United States Patent
Karlsson (10) Patent No.: US 11,719,201 B2
(45) Date of Patent: Aug. 8, 2023

(54) AIR INTAKE DEVICE FOR A VEHICLE

(71) Applicant: Ningbo Geely Automobile Research & Development Co., Ltd., Ningbo (CN)

(72) Inventor: Anders Karlsson, Västra Frölunda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 71 days.

(21) Appl. No.: 17/405,941

(22) Filed: Aug. 18, 2021

(65) Prior Publication Data

US 2021/0381476 A1  Dec. 9, 2021

Related U.S. Application Data

(63) Continuation of application No. PCT/CN2020/075546, filed on Feb. 17, 2020.

(30) Foreign Application Priority Data

Feb. 28, 2019 (EP) ..................................... 19160110

(51) Int. Cl.
*F02M 35/02* (2006.01)
*F02M 35/022* (2006.01)
(Continued)

(52) U.S. Cl.
CPC ......... *F02M 35/0226* (2013.01); *B01D 45/02* (2013.01); *B01D 45/12* (2013.01);
(Continued)

(58) Field of Classification Search
CPC ............... F02M 35/0226; F02M 35/08; F02M 35/10091; F02M 35/10262;
(Continued)

(56) References Cited

U.S. PATENT DOCUMENTS 2,267,706 A * 12/1941 Baile ................ F02M 35/10157
55/461
4,699,639 A 10/1987 Gieseke
(Continued)

FOREIGN PATENT DOCUMENTS

CN  104727995 A  6/2015
CN  204956087 U  1/2016
(Continued)

OTHER PUBLICATIONS

International Search Report from corresponding International Application No. PCT/CN2020/075546, dated May 14, 2020, 2 pages.

*Primary Examiner* — Hung Q Nguyen
(74) *Attorney, Agent, or Firm* — Tucker Ellis LLP (57) ABSTRACT

An air intake device for a vehicle. The device includes an inlet for air, a first outlet arranged for providing air to an engine of the vehicle and a second outlet arranged for discharging liquid separated from the air provided to the first outlet, and an intermediate portion forming an air channel extending from the inlet to the first outlet and the second outlet. A bottom surface on the inside of the intermediate portion is inclined relative to a horizontal plane for directing liquid in the air channel towards the second outlet.

10 Claims, 11 Drawing Sheets

(51) Int. Cl.
*B01D 45/02* (2006.01)
*B01D 45/12* (2006.01)
*F02M 35/08* (2006.01)
*F02M 35/10* (2006.01)
*F02M 35/16* (2006.01)

(52) U.S. Cl.
CPC ...... *F02M 35/08* (2013.01); *F02M 35/10091* (2013.01); *F02M 35/10262* (2013.01); *F02M 35/10013* (2013.01); *F02M 35/161* (2013.01)

(58) Field of Classification Search
CPC ........... F02M 35/10013; F02M 35/161; B01D 45/02; B01D 45/12; B01D 45/04; Y02T 10/12
See application file for complete search history.

(56) References Cited

U.S. PATENT DOCUMENTS

| | | | | |
|---|---|---|---|---|
| 4,793,293 A | * | 12/1988 | Minami | F01P 1/06 |
| | | | | 123/41.7 |
| 4,878,555 A | * | 11/1989 | Yasunaga | F02M 35/10013 |
| | | | | 180/68.3 |
| 4,946,482 A | * | 8/1990 | Tamba | F02M 35/022 |
| | | | | 123/41.58 |
| 5,328,395 A | | 7/1994 | Oishi | |
| 5,564,513 A | * | 10/1996 | Wible | F02M 35/161 |
| | | | | 180/68.3 |
| 9,062,639 B1 | * | 6/2015 | MacKenzie | B62D 25/12 |
| 2005/0098142 A1 | | 5/2005 | Nakagome | |
| 2005/0274347 A1 | | 12/2005 | Cusumano | |

FOREIGN PATENT DOCUMENTS

| | | | | |
|---|---|---|---|---|
| CN | 107542606 A | | 1/2018 | |
| DE | 102012023856 A1 | * | 6/2014 | ......... F02M 35/0201 |
| DE | 102015221488 A1 | * | 5/2016 | ............. B60K 13/02 |
| EP | 2907998 A1 | * | 8/2015 | ............. F02M 35/06 |
| FR | 2982800 A1 | | 5/2013 | |
| GB | 849909 A | | 9/1960 | |
| JP | H0534019 U | * | 5/1993 | |
| JP | 2004218482 A | * | 8/2004 | |
| JP | 2014141908 A | | 8/2014 | |
| JP | 2016175520 A | | 10/2016 | |
| KR | 101619901 B1 | * | 5/2016 | |

* cited by examiner

AIR INTAKE DEVICE FOR A VEHICLE

RELATED APPLICATION DATA

This application is a continuation of International Patent Application No. PCT/CN2020/075546, filed Feb. 17, 2020, which claims the benefit of European Patent Application No. 19160110.3, filed Feb. 28, 2019, the disclosures of which are incorporated herein by reference in their entireties.

TECHNICAL FIELD

The invention relates to an air intake device for a vehicle, for providing air to an engine of the vehicle.

BACKGROUND

A vehicle with an internal combustion engine (ICE) has an air intake for providing air to the engine. The air usually passes a filter box with an air filter where the air is cleaned from particles etc. before entering the engine. Upstream the filter box the air intake has a duct for leading air from the front part of the vehicle towards the engine.

It is important that water does not reach the filter box via the air intake duct and further into the engine which otherwise could cause engine failure, for example when the vehicle is to be started. A vehicle has to undergo tests where the vehicle is exposed to water and the air intake should be designed to be able to manage such tests and prevent or at least counteract water from reaching the air filter.

SUMMARY

An objective of the invention is to provide an air intake device for a vehicle, for providing air to an engine of the vehicle, which device has an improved ability to prevent water from reaching the engine of the vehicle.

The objective is achieved by an air intake device, wherein the device comprises an inlet for air, a first outlet arranged for providing air to an engine of the vehicle and a second outlet arranged for discharging liquid separated from the air provided to the first outlet, and an intermediate portion forming an air channel extending from the inlet to the first outlet and the second outlet, and wherein a bottom surface on the inside of the intermediate portion is inclined relative to a horizontal plane for directing liquid in the air channel towards the second outlet.

The invention is based on the insight that by such an air intake device, water accidentally entering the inlet of the air intake device can be drained and led out from the system through the second outlet.

The expression "inclined relative to a horizontal plane" is used with respect to the orientation of a bottom surface when the air intake device is installed in the intended position in a vehicle, which vehicle stands on substantially level ground. In other words; the orientation of the bottom surface of the intermediate portion is arranged such when the air intake device is installed in the vehicle, the bottom surface is inclined relative to the horizontal plane when the vehicle is standing horizontally. This is also true for other inclination angles described herein unless other is explicitly stated.

The term inlet is used for an opening where air is intended to flow into the air channel of the intermediate portion. The terms first outlet and second outlet are used for describing openings where the air and any water, respectively, are intended to leave the air channel of the intermediate portion. However, downstream the first outlet and/or the second outlet a further channel can be arranged for further transportation of the air and any water drained from the air, respectively. The first outlet and the second outlet can be arranged to face in a longitudinal main extension direction of the air channel and be arranged adjacent to each other. Hereby, an efficient drainage of water can be achieved by a compact and non-complicated design of the air intake device.

According to one embodiment of the device, the bottom surface has an inclination angle $\alpha$ relative to the horizontal plane in a direction perpendicular to a longitudinal main extension direction of the air channel, and preferably the bottom surface has a downward slope in a direction from the first outlet to the second outlet. Hereby, an efficient drainage of water can be achieved since any water present in the air channel is directed towards the second inlet by gravity.

The inclination angle $\alpha$ can be in the interval $0<\alpha<30°$, suitably $2<\alpha<20°$, preferably $3<\alpha<15°$, and often $5<\alpha<10°$.

The bottom surface can have a first part extending to the first outlet, which first bottom surface part has a first inclination angle $\alpha 1$, and a second part extending to the second outlet, which second bottom surface part has a second inclination angle $\alpha 2$. The first bottom surface part extending to the first outlet and the second bottom surface part extending to the second outlet can be connected by a threshold step such that the first bottom surface part is arranged on a higher level than the second bottom surface part. The first bottom surface part extending to the first outlet and the second bottom surface part extending to the second outlet can be arranged side by side in the intermediate portion.

The first inclination angle $\alpha 1$ can be in the interval $0<\alpha 1<30°$, suitably $2<\alpha 1<20°$, preferably $3<\alpha 1<15°$, and often $5<\alpha 1<10°$.

The second inclination angle $\alpha 2$ can be in the interval $0<\alpha 2<30°$, suitably $2<\alpha 2<20°$, preferably $3<\alpha 2<15°$, and often $5<\alpha 2<10°$.

The first inclination angle $\alpha 1$ and the second inclination angle $\alpha 2$ can be different from each other.

According to a further embodiment, the bottom surface has an inclination angle relative to the horizontal plane in a longitudinal main extension direction of the air channel. A first bottom surface part extending to the first outlet preferably has an upward slope as seen in the direction from the inlet to the first outlet. Hereby, the possibility that water will reach the first outlet is further counteracted.

The inclination angle $\beta$ can be in the interval $0<\beta<30°$, suitably $2<\beta<20°$, preferably $3<\beta<15°$, and often $5<\beta<10°$.

According to a further embodiment, the bottom surface has a first part extending to the first outlet, which first bottom surface part has a first inclination angle $\beta 1$, and a second part extending to the second outlet, which second bottom surface part has a second inclination angle $\beta 2$, wherein the first inclination angle $\beta 1$ and the second inclination angle $\beta 2$ are different from each other. Hereby, it is possible to counteract water to reach the first outlet and facilitate water to reach the second outlet.

The first bottom surface part extending to the first outlet can have an upward slope as seen in the direction from the inlet to the first outlet, and the second bottom surface part extending to the second outlet can have a downward slope as seen in the direction from the inlet to the second outlet. The first bottom surface part extending to the first outlet and the second bottom surface part extending to the second outlet can be arranged side by side in the intermediate portion.

The first inclination angle β1 can be in the interval 0<β1<30°, suitably 2<β1<20°, preferably 3<β1<15°, and often 5<β1<10°.

The second inclination angle β2 can be in the interval 0<β2<30°, suitably 2<β2<20°, preferably 3<β2<15°, and often 5<β2<10°.

The first inclination angle β1 and the second inclination angle β2 can be different from each other.

According to a further embodiment, the intermediate portion has a bend portion making the air channel curved. Hereby, any water in the air channel can be directed towards the second outlet by centrifugal force.

The first bottom surface part extending to the first outlet and the second bottom surface part extending to the second outlet can be arranged side by side in the bend portion, wherein the first bottom surface part extending to the first outlet is arranged along an inner curve of the bend portion and the second bottom surface part extending to the second outlet is arranged along an outer curve of the bend portion.

According to a further embodiment, a part of the intermediate portion bottom surface adjacent to the first outlet and a bottom surface defining the first outlet are connected by a threshold step such that the first outlet bottom surface is arranged at a higher level than the adjacent intermediate portion bottom surface part. Hereby, it is possible to further counteract water from reaching the first outlet.

Another aspect of the invention relates to vehicle comprising an air intake device. The advantages of the vehicle are substantially the same as described for the air intake device described hereinabove.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
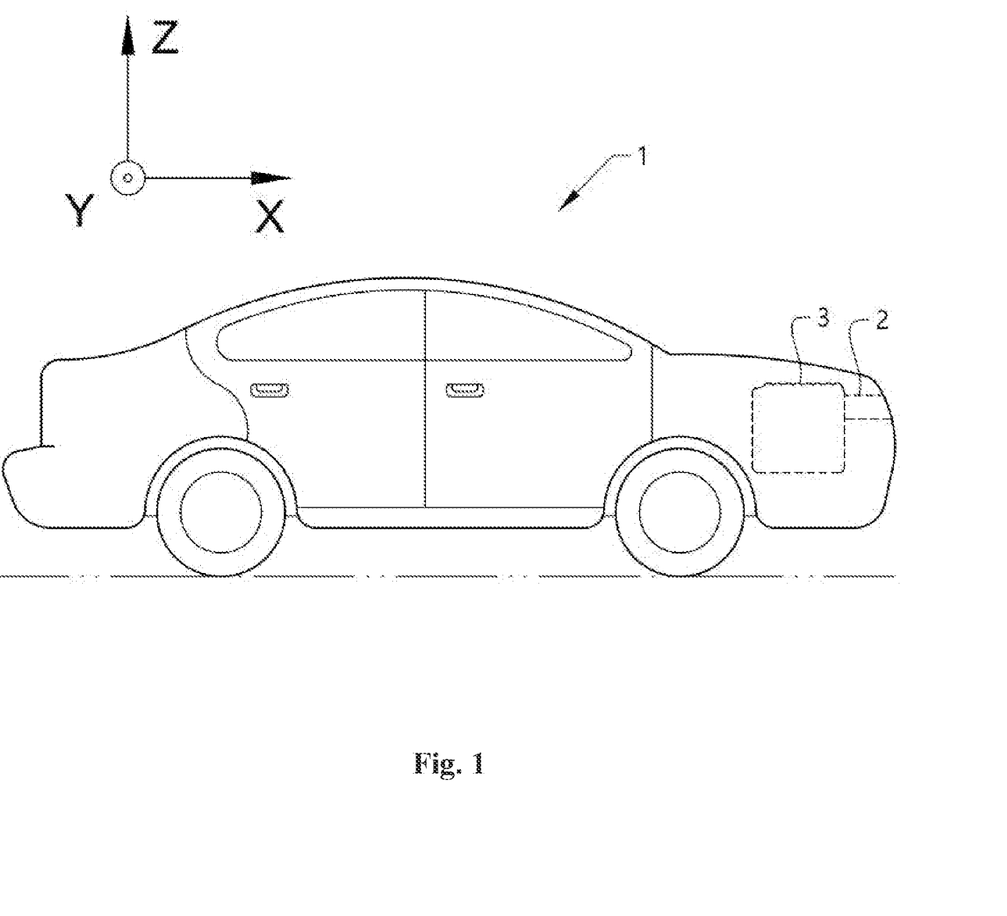
FIG. 1 shows a vehicle with an air intake device for providing air to an engine.

FIG. 1 shows a vehicle 1 with an air intake device 2. The air intake device 2 is suitably arranged in the front of the vehicle 1 for providing air to an engine 3 of the vehicle. In FIG. 1, a Cartesian coordinate system having an X-axis, a Y-axis and a Z-axis is also indicated. The X-axis is arranged in parallel with a longitudinal extension direction of the vehicle (i.e. the driving direction), the Z-axis is arranged in the vertical direction and a horizontal plane is defined by the X-axis and the Y-axis.

Figure 2A:
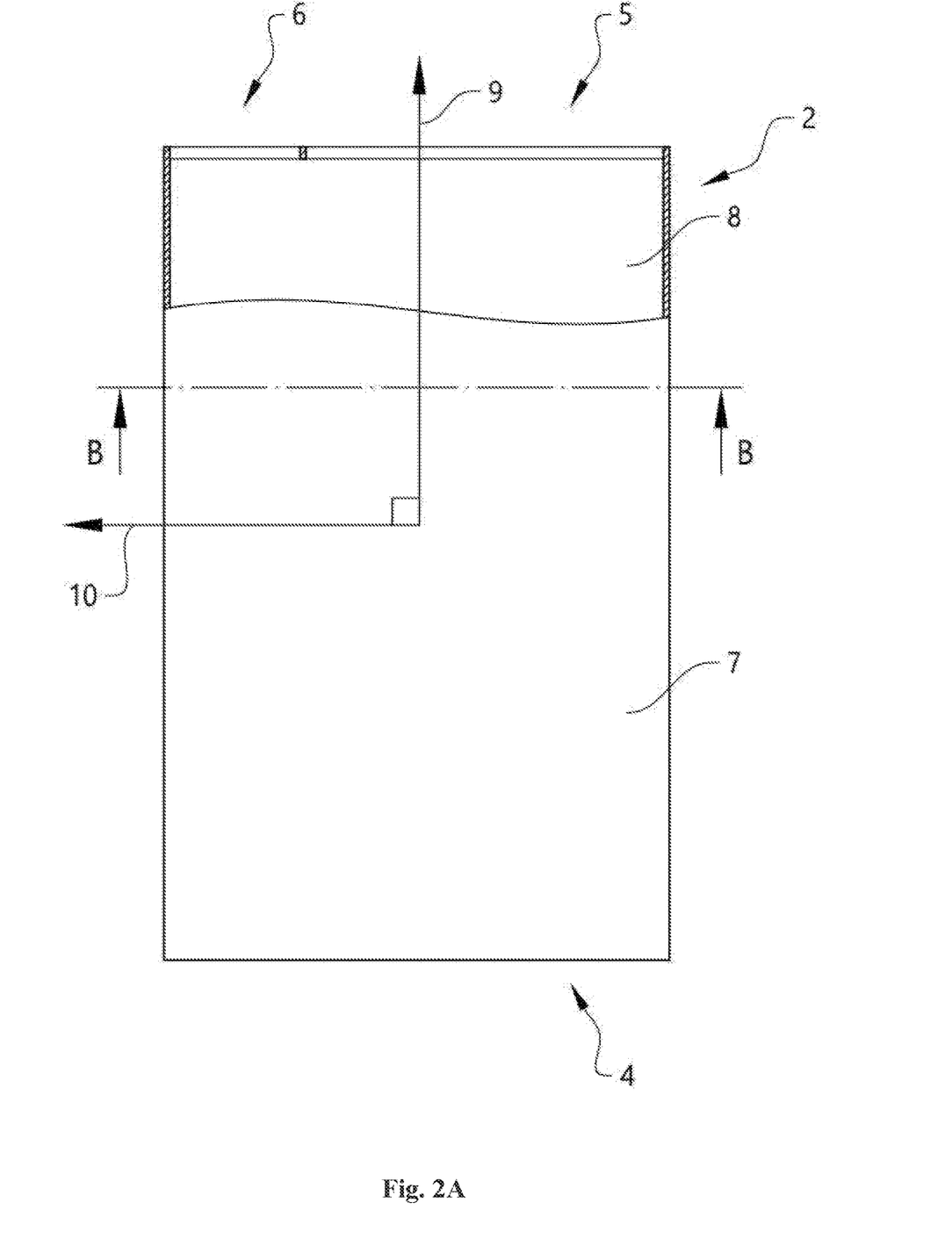
FIG. 2A is a schematic view of an air intake device.

FIG. 2A is a schematic view of the air intake device 2 as seen from above in a direction in parallel with the Z-axis in FIG. 1. As schematically illustrated in FIG. 2A, the air intake device 2 comprises an inlet 4 for air, a first outlet 5 arranged for providing air to an engine (not shown in FIG. 2A) of the vehicle and a second outlet 6 arranged for discharging liquid separated from the air provided to the first outlet 5. In addition to liquid also air will pass through the second outlet as well as any particles such as snow, ice and dirt.

The air inlet 4 is preferably arranged in the front of the vehicle for receiving air in a direction in parallel with the X-axis illustrated in FIG. 1. Further, the air intake device 2 comprises an intermediate portion 7 forming an air channel 8 extending from the air inlet 4 to the first outlet 5 and the second outlet 6. A longitudinal main extension direction 9 of the air channel 8 and a direction 10 perpendicular to the longitudinal main extension direction 9 of the air channel 8 are indicated in FIG. 2A. These directions 9, 10 define a horizontal plane. The air intake device 2 is suitably made by one or more pipe portions for providing a hollow structure and forming the air channel 8.

Figure 2B:
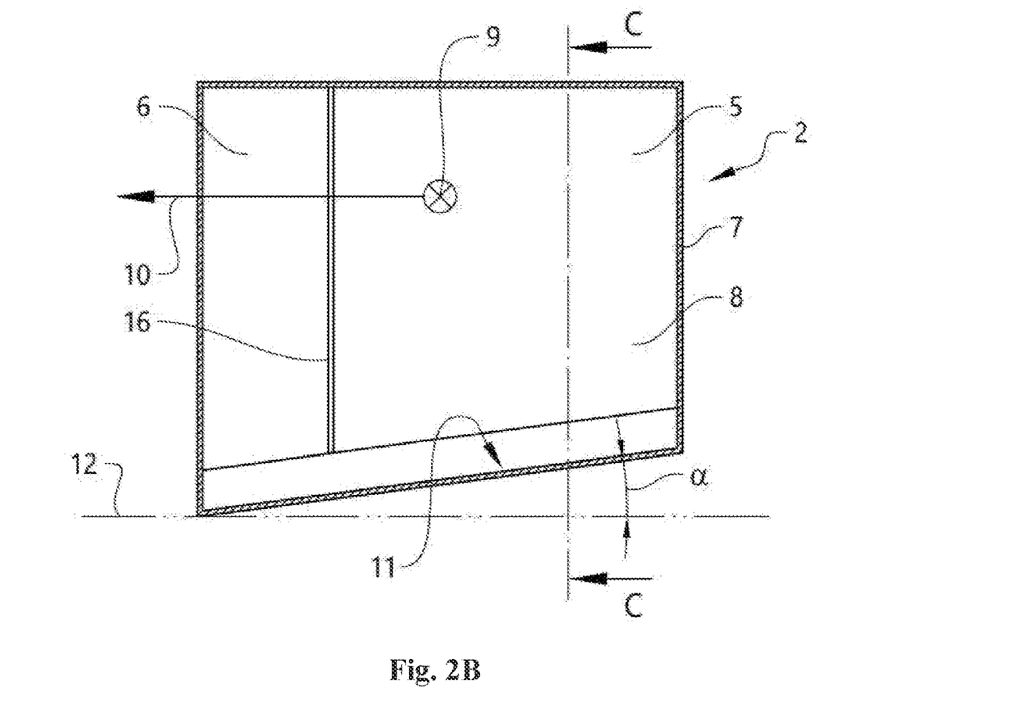
FIG. 2B is cross-section view taken along B-B in FIG. 2A, FIG. 2B' shows a variant of the air intake device in FIG. 2A, FIG. 2B" shows a further variant of the air intake device in FIG. 2A.

FIG. 2B is a cross-section view taken along B-B in FIG. 2A. The first outlet 5 is arranged to the right and the second outlet 6 is arranged to the left. The first outlet 5 and the second outlet 6 can be separated by a wall. In the example embodiment illustrated in FIG. 2B, the air channel 8 is divided into the first outlet 5 and second outlet 6 by a substantially vertical wall 16 at an end of the intermediate portion 7. As previously mentioned hereinabove, connection pipes can be arranged at the first outlet 5 and the second outlet 6 for further transportation of air downstream the first outlet 5 and water downstream the second outlet 6.

A bottom surface 11 on the inside of the intermediate portion 7 is inclined relative to a horizontal plane 12 for directing liquid in the air channel 8 towards the second outlet 6 by gravity. This means that the bottom surface 11 is inclined relative to the plane defined by the X-axis and the Y-axis in FIG. 1, when the air intake device is properly installed in the vehicle standing on even ground. The bottom surface 11 has an inclination angle α relative to the horizontal plane 12 in the direction 10 perpendicular to the longitudinal main extension direction 9 of the air channel 8. In other words; α is a transverse inclination angle. Due to the transverse inclination angle, the bottom surface 11 has a downward slope in a direction from the first outlet 5 to the second outlet 6.

FIG. 2B' is a cross-section view taken along B-B in FIG. 2A for a further example embodiment of the air intake device 2'. The bottom surface 11' has a first part 13 extending to the first outlet 5', which first bottom surface part 13 has a first inclination angle α1 relative to the horizontal plane 12, and a second part 14 extending to the second outlet 6, which second bottom surface part 14 has a second inclination angle α2 relative to the horizontal plane 12.

FIG. 2B" is a cross-section view taken along B-B in FIG. 2A for a further example embodiment of the air intake device. In the same way as described with reference to FIG. 2B', the bottom surface 11 has a first part 13" extending to the first outlet 5", which first bottom surface part 13" has a first inclination angle α1 relative to the horizontal plane 12, and a second part 14" extending to the second outlet 6", which second bottom surface part 14" has a second inclination angle α2 relative to the horizontal plane 12.

In the example embodiment illustrated in FIG. 2B", the first bottom surface part 13" extending to the first outlet 5" and the second bottom surface part 14" extending to the second outlet 6" are connected by a threshold step 15 such that the first bottom surface part 13" is arranged on a higher level than the second bottom surface part 14". In other words; the threshold step has an extension component in the vertical direction. The threshold step 15, which can be formed by a vertical or inclined wall, is suitably arranged such that the threshold step 15 divides the intermediate portion bottom surface 11" into the first bottom surface part 13" extending to the first outlet 5" and the second bottom surface part 14" extending to the second outlet 6". In other words; the threshold step 15 and the wall 16 separating the first inlet and the second inlet from each other, can be arranged at the same position with respect to the direction 10 perpendicular to the longitudinal main extension direction 9 of the air channel 8. Thus, the width of the air channel part having the first bottom surface part 13" can correspond to the width of the first outlet 5" and the width of the air channel part having the second bottom surface part 14" can correspond to the width of the second outlet 6".

Figure 2C:
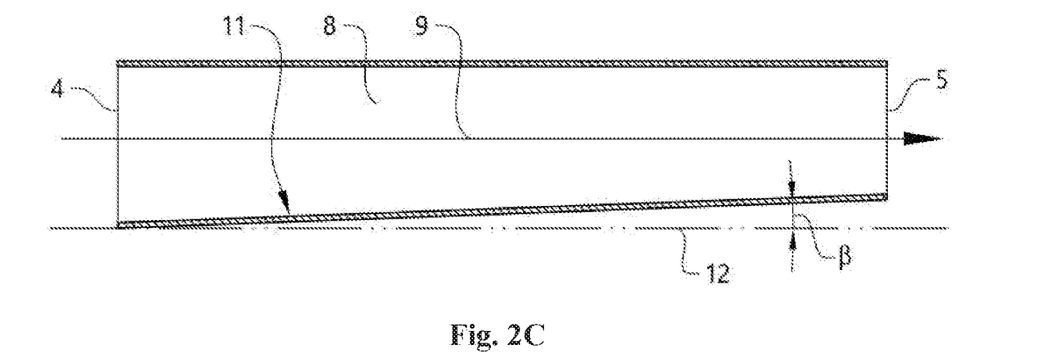
FIG. 2C is a cut view taken along C-C in FIG. 2B.

FIG. 2C is a cut view taken along C-C in FIG. 2B. As illustrated in FIG. 2C, the bottom surface 11 can have an inclination angle β relative to the horizontal plane 12 in the longitudinal main extension direction 9 of the air channel 8. In other words; β is a longitudinal inclination angle. In the example embodiment illustrated in FIG. 2C, due to the longitudinal inclination angle the bottom surface 11 has an upward slope as seen in the direction from the inlet 4 to the first outlet 5.

Figure 2D:
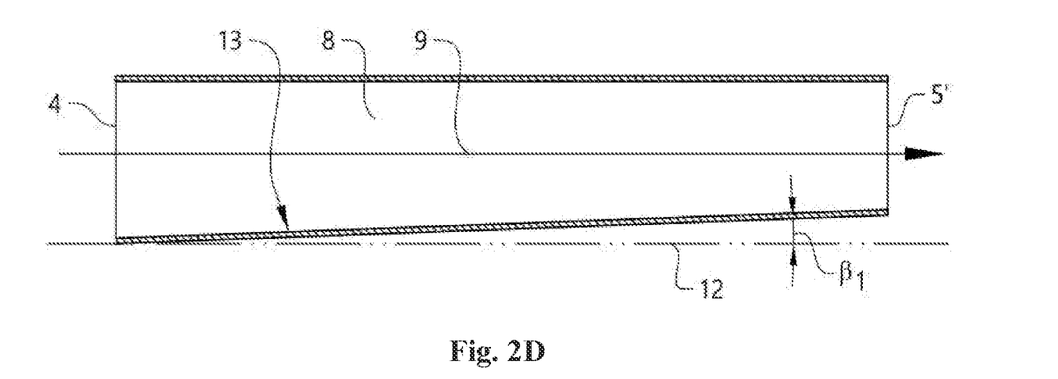
FIG. 2D is a cut view taken along D-D in FIG. 2B'.
Figure 2E:
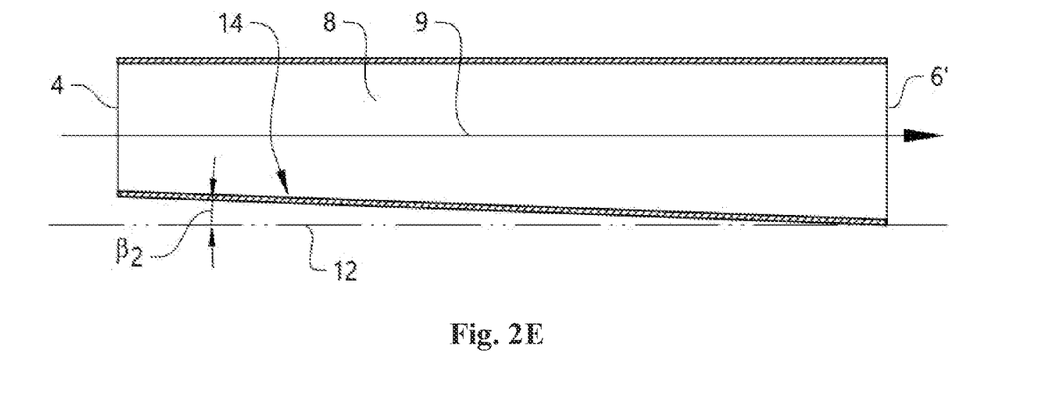
FIG. 2E is a cut view taken along E-E in FIG. 2B'.

FIG. 2D and FIG. 2E are cut views taken along D-D and E-E, respectively, in FIG. 2B'. As illustrated in FIGS. 2D and 2E, the bottom surface 11' can have a first part 13 extending to the first outlet 5', which first bottom surface part 13 has a first inclination angle β1, and a second part 14 extending to the second outlet 6', which second bottom surface part 14 has a second inclination angle β2, where the first inclination angle β1 and the second inclination angle β2 are different from each other. In the example embodiment illustrated in FIGS. 2D and 2E, the first bottom surface part 13 extending to the first outlet 5' has an upward slope as seen in the direction from the inlet 4 to the first outlet 5' and the second bottom surface part 14 extending to the second outlet 6' has a downward slope as seen in the direction from the inlet 4 to the second outlet 6'.

Figure 3:
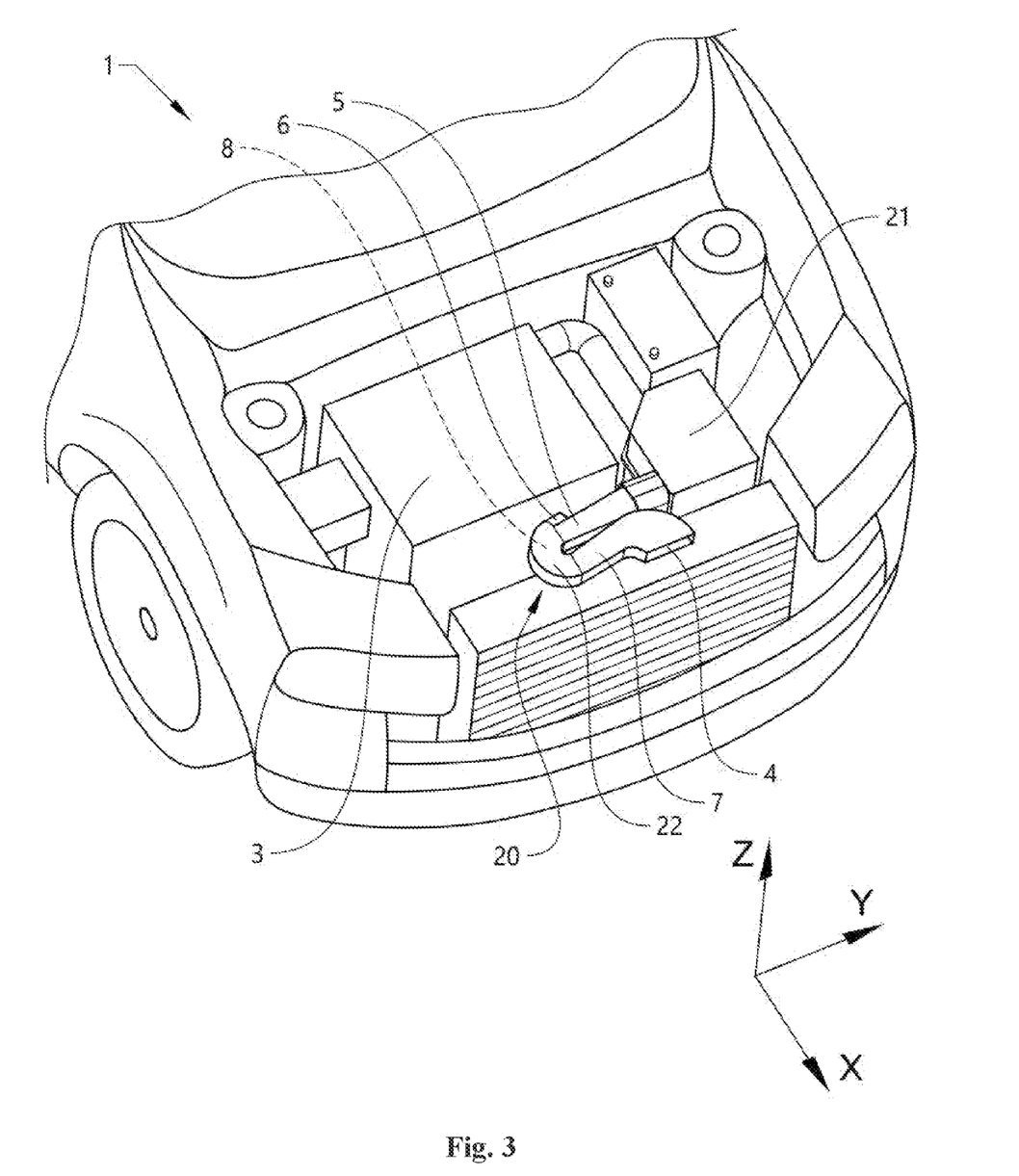
FIG. 3 is a perspective view of a vehicle showing the engine compartment with an air intake device.

FIG. 3 shows an example embodiment of the air intake device 20 when assembled in the vehicle 1. The air inlet 4 of the air intake device 20 is facing in a direction in parallel with the X-axis for receiving air from a position in the front of the vehicle 1. In another embodiment the air inlet could however be arranged in another direction, for example the air inlet could be facing in a direction in parallel with the Y-axis. In addition to air, some water, snow, ice and/or dirt may unintentionally pass the air inlet 4 and reach the intermediate portion 7.

The first outlet 5 of the air intake device 20 is connected to a filter box 21. Inside the filter box 21 one or more air filters is arranged for cleaning the air before the air reaches the engine 3. The second outlet 6 is arranged for discharging liquid such as water, separated from the air provided to the first outlet 5. Also air will pass through the second outlet 6 as well as particles such as snow, ice and dirt.

The intermediate portion 7 has a bend portion 22 making the air channel 8 extending from the inlet 4 to the first outlet 5 and the second outlet 6 curved. The intermediate portion 7 is suitably curved in the horizontal plane defined by the X-axis and the Y-axis.

Figure 4A:
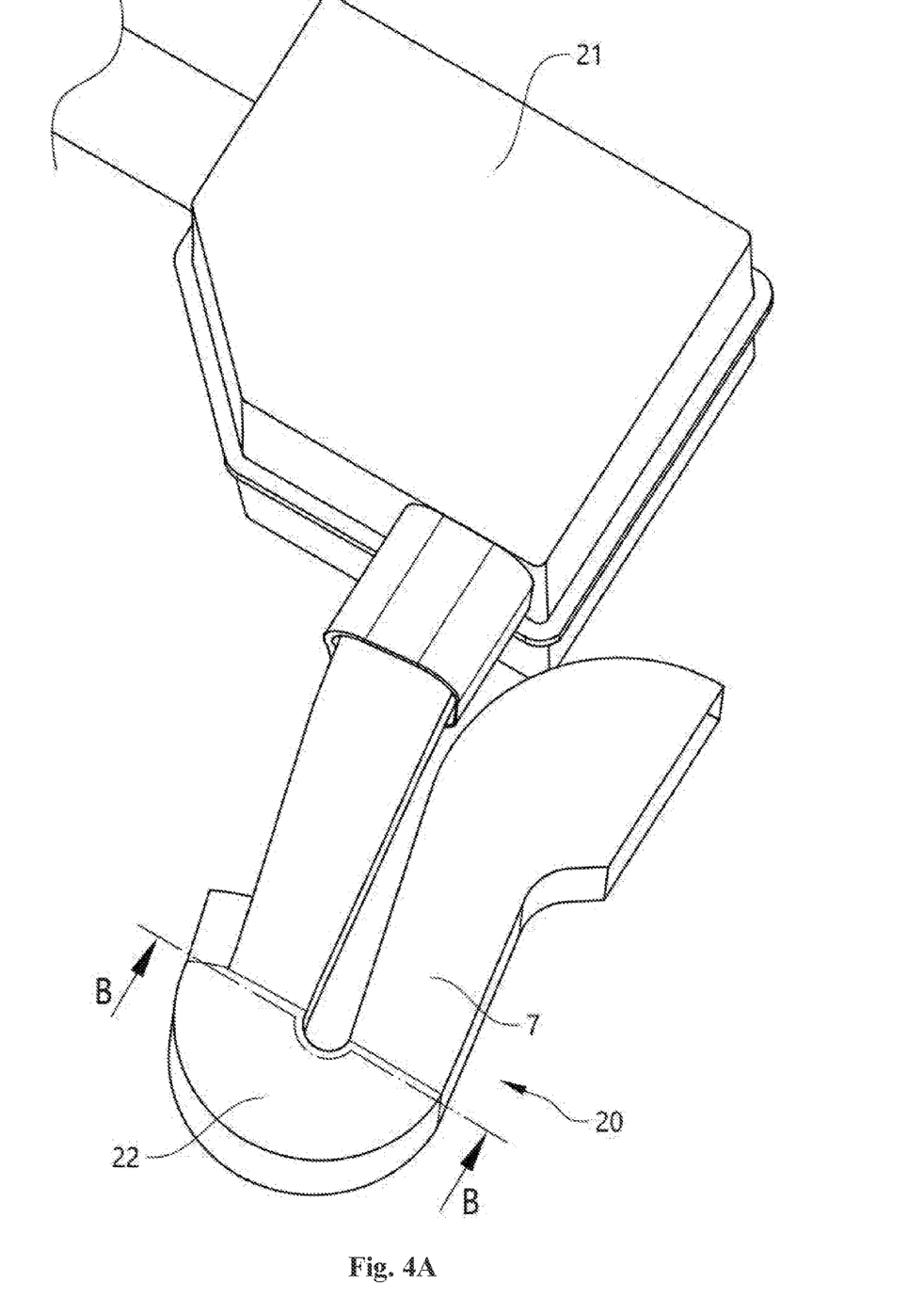
FIG. 4A is a perspective view of the air intake device in FIG. 3.

FIG. 4A shows an enlarged view of the air intake device 20 and the filter box 21 illustrated in FIG. 3. In this example embodiment, the bend portion 22 of the intermediate portion 7 is provided with the bottom surface being inclined relative to the horizontal plane. This is further illustrated in FIG. 4B. The bend portion 22 of the intermediate portion 7 can extend approximately 180° and the intermediate portion 7 can be S-shaped.

Figure 4B:
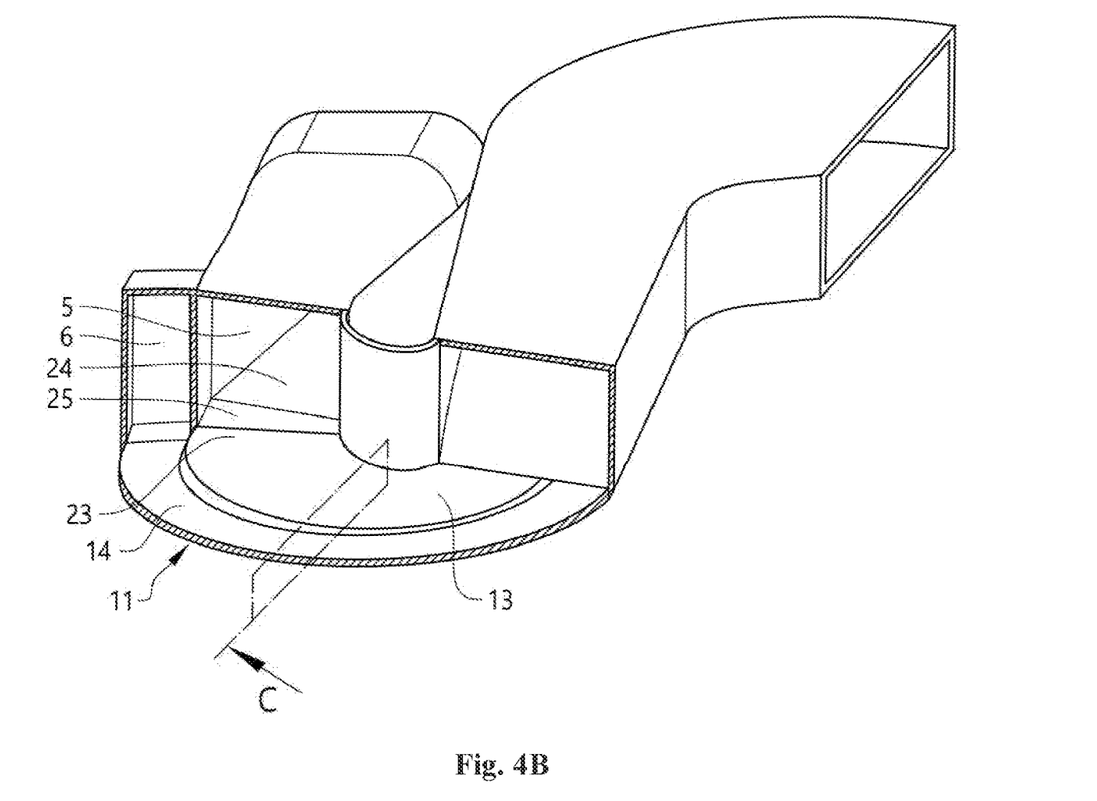
FIG. 4B is a cut view taken along B-B in FIG. 4A.

FIG. 4B is a cut view taken along B-B in FIG. 4A, where the bottom surface 11 of the bend portion 22 is shown. The first bottom surface part 13 extending to the first outlet 5 and the second bottom surface part 14 extending to the second outlet 6 are arranged side by side in the bend portion 22. The first bottom surface part 13 extending to the first outlet 5 is arranged along an inner curve of the bend portion 22 and the second bottom surface part 14 extending to the second outlet 6 is arranged along an outer curve of the bend portion 22.

A part 23 of the intermediate portion bottom surface 13 adjacent to the first outlet 5 and a bottom surface 24 defining the first outlet 5 are connected by a threshold step 25 such that the first outlet bottom surface 24 is arranged at a higher level than the adjacent intermediate portion bottom surface part 23.

As has been previously described hereinabove with reference to previous figures, such as FIGS. 2B', 2B", 2D and 2E, also in this example embodiment illustrated in FIGS. 4A and 4B, the first bottom surface part 13 can have a first inclination angle (indicated as β1 in previous Figs.) relative to the horizontal plane 12 forming an upward slope as seen in the direction from the inlet 4 to the first outlet 5. Further, the second bottom surface part 14 can have a second inclination angle (indicated as β2 in previous Figs.) relative to the horizontal plane 12 forming a downward slope as seen in the direction from the inlet 4 to the second outlet 6. Optionally, only the first bottom surface part 13 has an inclination angle β1 relative to the horizontal plane in the longitudinal main extension direction 9 of the air channel 8, i.e. β2=0.

Along the bend portion 22, the longitudinal main extension direction 9 of the air channel 8 is of course not constant, but is rather represented by the tangent to the curve of the intermediate portion 7.

Further, the first bottom surface part 13 can have a first inclination angle α1 relative to the horizontal plane 12 in the direction 10 perpendicular to the longitudinal main extension direction 9 of the air channel 8, and the second bottom surface part 14 can have a second inclination angle α2 relative to the horizontal plane 12 in the direction 10 perpendicular to the longitudinal main extension direction of the air channel, as also described for previous example embodiments hereinabove.

Figure 4C:
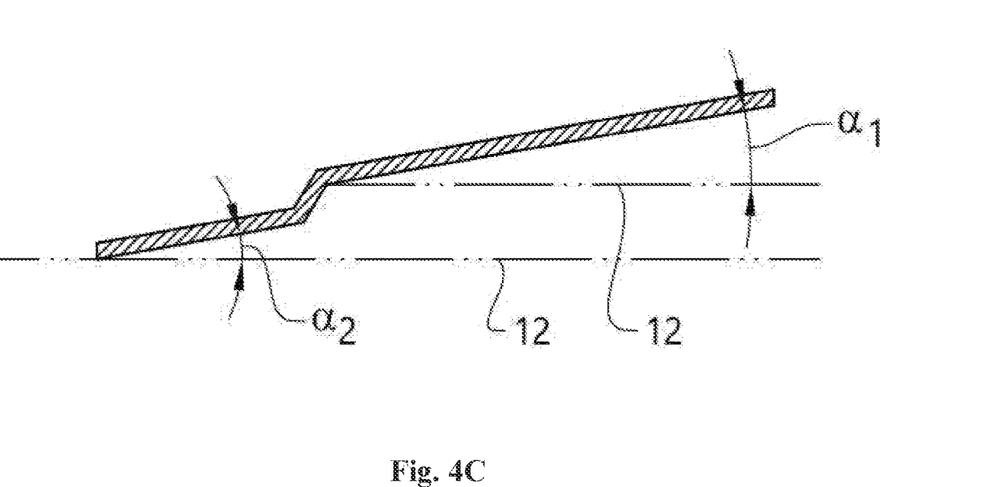
FIG. 4C is a cross-section view taken along C-C in FIG. 4B.

FIG. 4C is a cross-section view taken along C-C in FIG. 4B. As illustrated in FIG. 4C, the bend portion 22 has a downward slope in a direction from the first outlet 5 to the second outlet 6 along both the first bottom surface part 13 and the second bottom surface part 14. Optionally, only the first bottom surface part 13 has an inclination angle α1 relative to the horizontal plane 12 in the direction 10 perpendicular to the longitudinal main extension direction 9 of the air channel 8, i.e. α2=0.

With respect to all example embodiments described herein, it should be stressed that the inclination angles (α, α1, α2, β, β1, β2) do not need to be constants, but can vary along the longitudinal main extension direction of the air channel of the intermediate portion. For example, in the example embodiment described above, optionally the transverse inclination angle α1 can be increasing in the direction from the air inlet to the first outlet. Optionally, the longitudinal inclination angle β1 can also be increasing in the direction from the air inlet to the first outlet.

Figure 5:
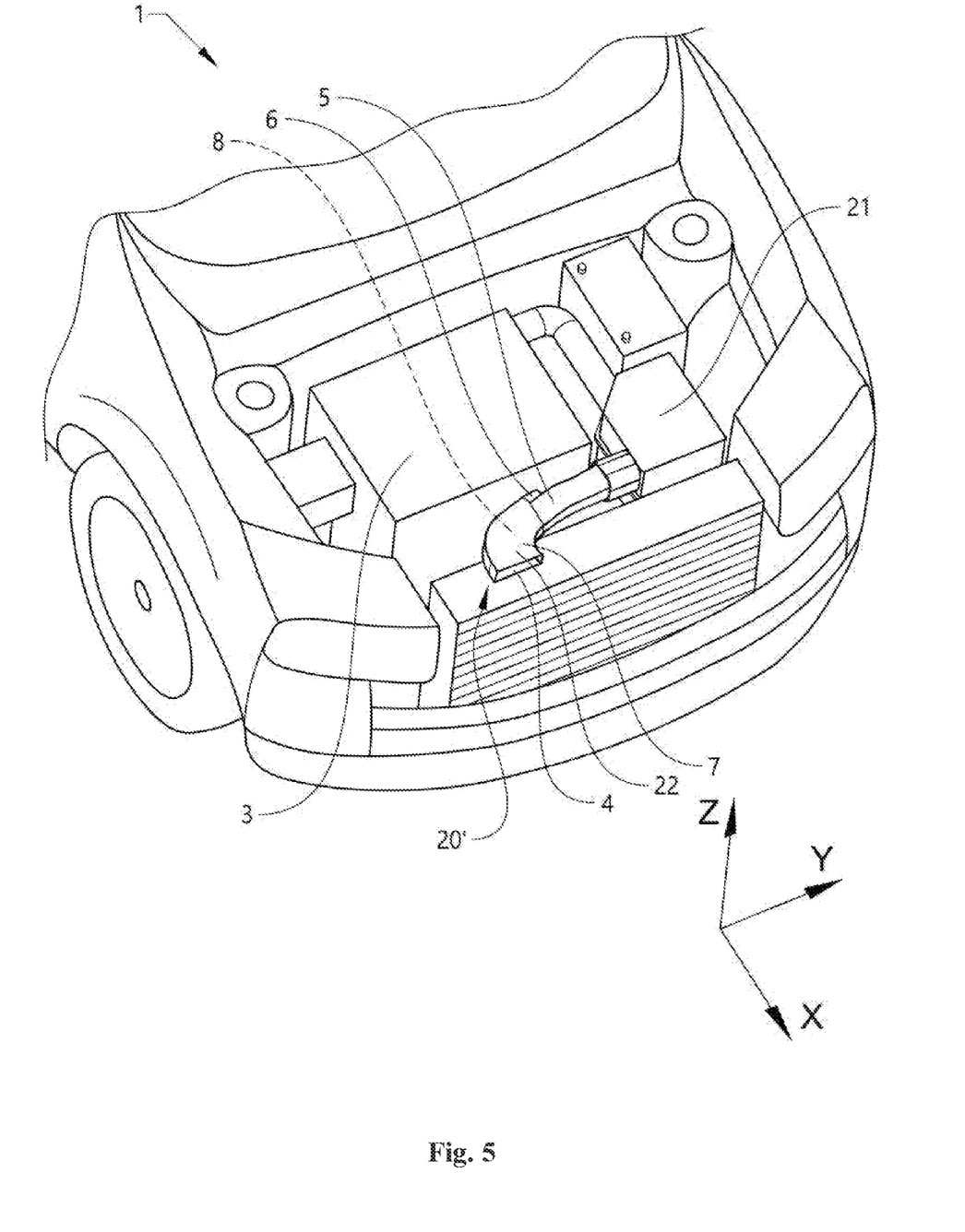
FIG. 5 is a perspective view of a vehicle showing the engine compartment with a further variant of an air intake device.

FIG. 5 shows a further example embodiment of the air intake device when assembled in the vehicle. The air inlet 4 of the air intake device 20' is facing in a direction in parallel with the X-axis for receiving air from a position in the front of the vehicle 1. In addition to air, some water, snow, ice and/or dirt may unintentionally pass the air inlet 4 and reach the intermediate portion 7.

The first outlet 5 of the air intake device 20' is connected to a filter box 21. Inside the filter box 21 one or more air filters is arranged for cleaning the air before the air reaches the engine 3. The second outlet 6 is arranged for discharging liquid such as water, separated from the air provided to the first outlet 5. Also air will pass through the second outlet 6 as well as particles such as snow, ice and dirt.

The intermediate portion 7 has a bend portion 22' making the air channel 8 extending from the inlet 4 to the first outlet 5 and the second outlet 6 curved. The intermediate portion 7 is suitably curved in the horizontal plane defined by the X-axis and the Y-axis.

Figure 6A:
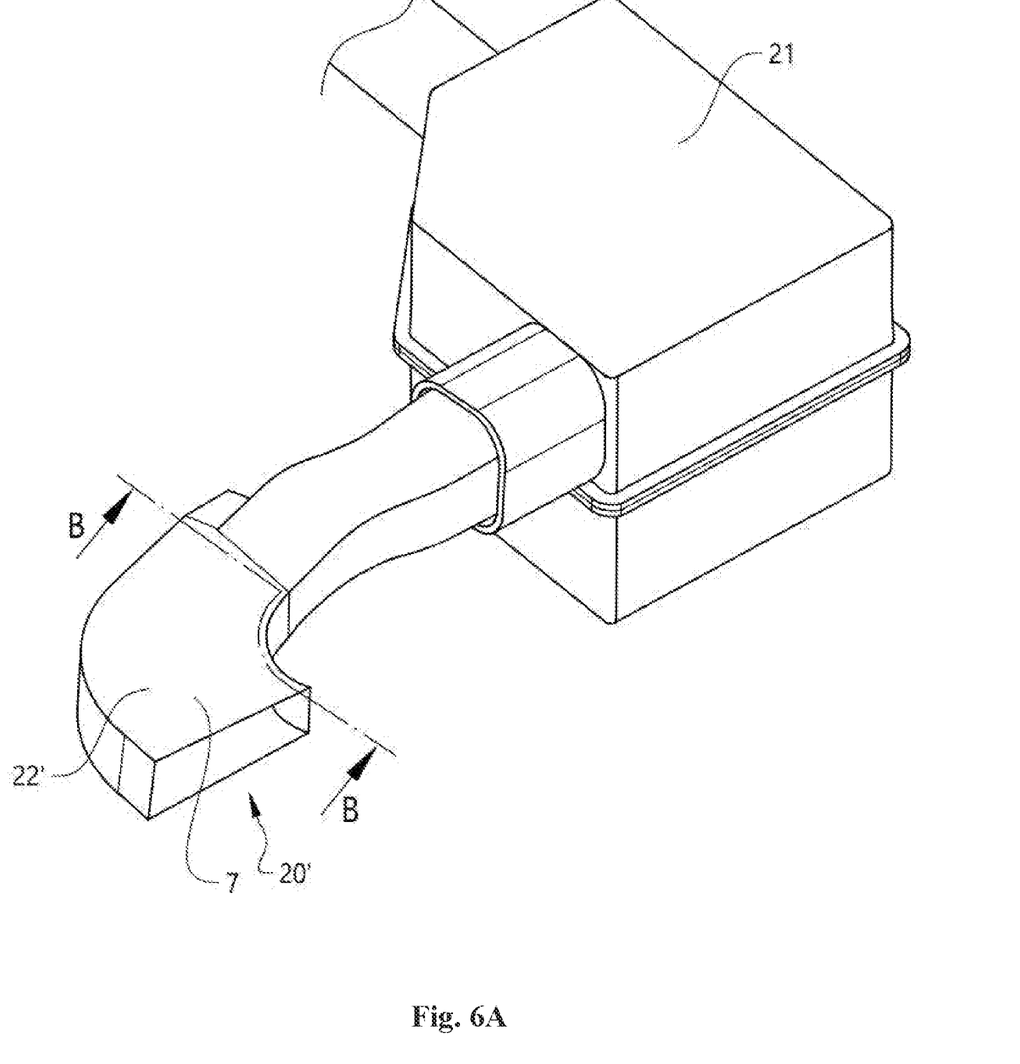
FIG. 6A is a perspective view of the air intake device in FIG. 5.

FIG. 6A shows an enlarged view of the air intake device 20' and the filter box 21 illustrated in FIG. 5. In this example embodiment, the bend portion 22' of the intermediate portion 7 is provided with the bottom surface which is inclined relative to the horizontal plane. This is further illustrated in FIG. 6B. The bend portion 22' of the intermediate portion 7 can extend approximately 90°.

Figure 6B:
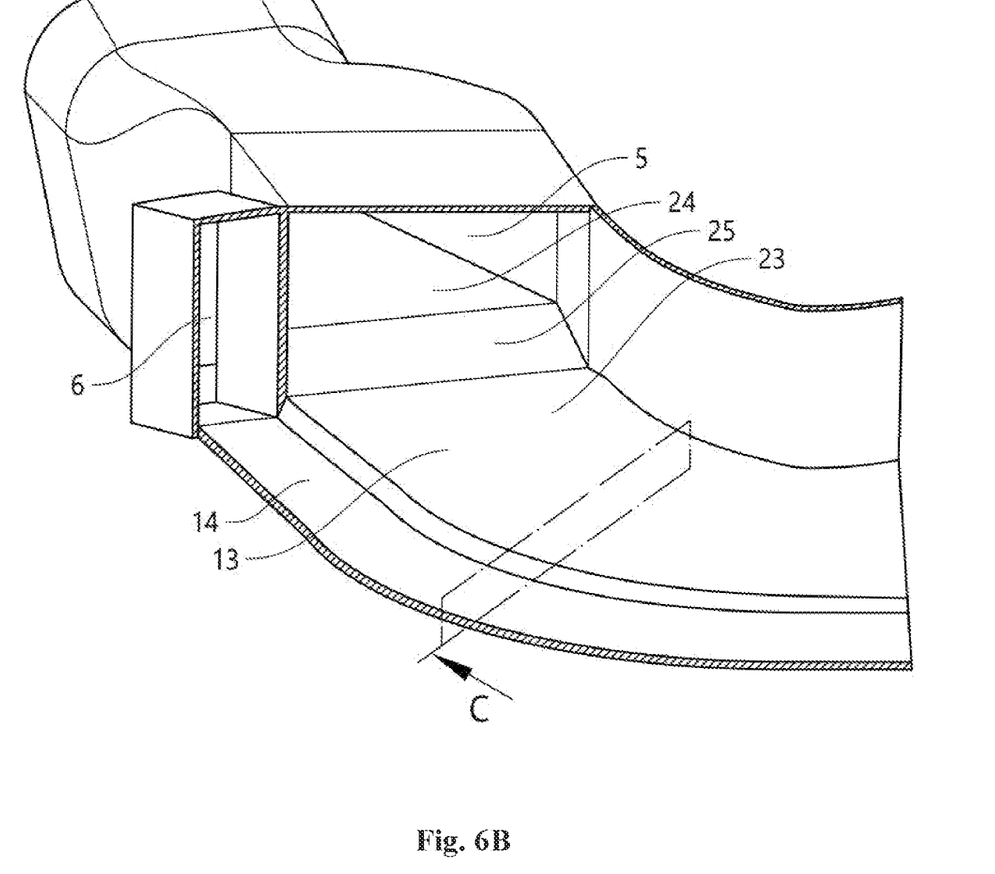
FIG. 6B is a cut view taken along B-B in FIG. 6A.

FIG. 6B is a cut view taken along B-B in FIG. 6A, where the bottom surface 11 of the bend portion 22' is shown. The first bottom surface part 13 extending to the first outlet 5 and the second bottom surface part 14 extending to the second outlet 6 are arranged side by side in the bend portion 22'. The first bottom surface part 13 extending to the first outlet 5 is arranged along an inner curve of the bend portion 22' and the second bottom surface part 14 extending to the second outlet 6 is arranged along an outer curve of the bend portion 22'.

A part 23 of the intermediate portion bottom surface 13 adjacent to the first outlet 5 and a bottom surface 24 defining the first outlet 5 are connected by a threshold step 25 such that the first outlet bottom surface 24 is arranged at a higher level than the adjacent intermediate portion bottom surface part 23.

As has been previously described hereinabove, also in this example embodiment illustrated in FIGS. 6A and 6B, the first bottom surface part 13 can have a first inclination angle (indicated as β1 in previous Figs.) relative to the horizontal plane 12 forming an upward slope as seen in the direction from the inlet 4 to the first outlet 5. Further, the second bottom surface part 14 can have a second inclination angle (indicated as β2 in previous Figs.) relative to the horizontal plane 12 forming a downward slope as seen in the direction from the inlet 4 to the second outlet 6. Optionally, only the first bottom surface part 13 has an inclination angle β1 relative to the horizontal plane in the longitudinal main extension direction 9 of the air channel 8, i.e. β2=0.

Along the bend portion 22', the longitudinal main extension direction 9 of the air channel 8 is of course not constant, but is rather represented by the tangent to the curve of the intermediate portion 7.

Further, the first bottom surface part 13 can have a first inclination angle α1 relative to the horizontal plane 12 in the direction 10 perpendicular to the longitudinal main extension direction 9 of the air channel 8 and the second bottom surface part 14 can have a second inclination angle α2 relative to the horizontal plane 12 in the direction 10 perpendicular to the longitudinal main extension direction of the air channel, as also described for previous example embodiments hereinabove.

Figure 6C:
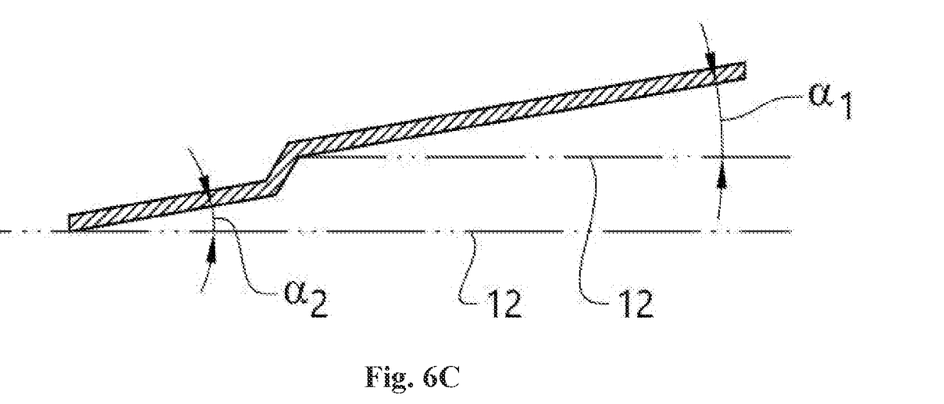
FIG. 6C is a cross-section view taken along C-C in FIG. 6B.

FIG. 6C is a cross-section view taken along C-C in FIG. 6B. As illustrated in FIG. 6C, the bend portion 22' has a downward slope in a direction from the first outlet 5 to the second outlet 6 along both the first bottom surface part 13 and the second bottom surface part 14. Optionally, only the first bottom surface part 13 has an inclination angle α1 relative to the horizontal plane 12 in the direction 10 perpendicular to the longitudinal main extension direction 9 of the air channel 8, i.e. α2=0.

It is to be understood that the present invention is not limited to the embodiments described above and illustrated in the drawings; rather, the skilled person will recognize that many changes and modifications may be made within the scope of the appended claims.

What is claimed is:

1. An air intake device for a vehicle, the device comprising:
    an inlet through which air is received into the air intake device,
    a first outlet through which air is discharged toward an engine of the vehicle,
    a second outlet through which liquid that has been separated from the air is discharged, and
    an intermediate portion forming an air channel extending in an airflow direction from the inlet to the first outlet and to the second outlet, wherein the air channel comprises a bottom surface formed by a lower wall of the intermediate portion and,
    wherein the bottom surface of the air channel is inclined relative to a horizontal plane for directing liquid in the air channel towards the second outlet and away from the first outlet, the bottom surface including:
        a first bottom surface portion extending from the first outlet along the intermediate portion toward the air intake at an upward inclination relative to the horizontal plane in the airflow direction from the inlet to the first outlet; and
        a second bottom surface portion extending from the second outlet along the intermediate portion toward the air intake at a downward inclination relative to the horizontal plane in the airflow direction from the inlet to the second outlet, and wherein, relative to the airflow direction, the first bottom surface and the second bottom surface portion are laterally adjacent to each other.

2. The device according to claim 1, wherein the first bottom surface portion and the second bottom surface portion are further inclined relative to the horizontal plane in a direction perpendicular to the airflow direction so that the bottom surface is higher in elevation along the first bottom surface portion than along the second bottom surface portion.

3. The device according to claim 2, wherein the bottom surface has a downward slope in a direction from the first outlet to the second outlet.

4. The device according to claim 2, wherein the inclination in the direction perpendicular to the airflow direction is different along the first bottom surface portion than along the second bottom surface portion.

5. The device according to claim 2, wherein the first bottom surface portion and the second bottom surface portion are connected by a threshold step that provides an increase in elevation to the first bottom surface portion relative the second bottom surface portion.

6. The device according to claim 1, wherein the intermediate portion has a bend portion making the air channel curved.

7. The device according to claim 1, wherein the first bottom surface portion and the second bottom surface portion are arranged laterally side by side in the bend portion, the first bottom surface portion arranged along an inner curve of the bend portion and the second bottom surface portion arranged along an outer curve of the bend portion.

8. The device according to claim 1, wherein the first outlet and the first bottom surface portion are connected by a threshold step such that the first outlet is higher in elevation than the first bottom surface portion.

9. A vehicle comprising the air intake device according to claim 1.

10. A device according to claim 1, wherein, relative to the airflow direction, the first outlet and the second outlet are laterally adjacent to each other.

* * * * *